United States Patent [19]
Jacobson

[11] Patent Number: 4,917,537
[45] Date of Patent: Apr. 17, 1990

[54] FLUID IMPERVIOUS, MULTIPLE PANEL LINING SYSTEM

[76] Inventor: Carl C. Jacobson, 1355 E. Calle de Caballo, Tempe, Ariz. 85284

[21] Appl. No.: 336,897

[22] Filed: Apr. 12, 1989

[51] Int. Cl.[4] .................................................. B09B 1/00
[52] U.S. Cl. ..................................... 405/52; 405/128; 405/270
[58] Field of Search ................ 405/129, 128, 270, 53, 405/38, 52, 268, 263

[56] References Cited

U.S. PATENT DOCUMENTS

| | | | |
|---|---|---|---|
| 2,061,098 | 11/1936 | Johnson | 405/150 |
| 2,138,366 | 11/1938 | Baird | 405/265 |
| 2,333,287 | 11/1943 | Baird | 405/265 |
| 2,789,399 | 4/1957 | Finn | 405/258 X |
| 3,344,608 | 10/1967 | McEachran | 405/265 |
| 3,874,175 | 4/1975 | Winters | 405/128 |
| 3,949,113 | 4/1976 | Draper et al. | 405/270 X |
| 4,166,709 | 9/1979 | Valiga | 405/128 |
| 4,194,855 | 3/1980 | Egger | 405/128 |
| 4,344,722 | 8/1982 | Blais | 405/270 |
| 4,362,434 | 12/1982 | Valiga | 405/128 |
| 4,451,173 | 5/1984 | Watson | 405/53 |
| 4,565,468 | 1/1986 | Crawford | 405/270 |
| 4,678,375 | 7/1987 | Gagle | 405/270 |
| 4,741,132 | 5/1988 | Emblin | 52/58 |
| 4,786,208 | 11/1988 | Raviv | 405/270 X |
| 4,806,435 | 2/1989 | Athey | 405/270 X |

FOREIGN PATENT DOCUMENTS

| | | | |
|---|---|---|---|
| 2351213 | 5/1974 | Fed. Rep. of Germany . | |
| 3630969 | 3/1988 | Fed. Rep. of Germany | 405/270 |
| 48-35773 | 10/1973 | Japan | 405/265 |

Primary Examiner—Randolph A. Reese
Assistant Examiner—J. Russell McBee
Attorney, Agent, or Firm—Cahill, Sutton & Thomas

[57] ABSTRACT

The multiple panel lining system is positioned adjacent to and supported by an inclined support surface. A horizontally extending support cable is positioned adjacent to the inclined support surface. Each of a plurality of spaced apart anchors is secured to the inclined support surface and to the support cable to maintain the support cable at a fixed vertical elevation and to transfer loads imposed on the support cable to the inclined support surface. A series of foldable panels with an open mesh network are draped over and supported from above by the support cable. Each panel includes an inner layer which contacts the inclined surface and an outer layer which is placed above and overlaps the inner layer. A first sealant layer is applied to and supported by the mesh network of the inner layer of the panel. A second sealant layer is applied to and supported by the mesh network of the outer layer of the panel and by the first sealant layer. A series of stress absorbing joints are formed within vertical overlap zones between laterally adjacent panels. A series of stress absorbing joints are formed within horizontal overlap zones between vertically adjacent panels.

44 Claims, 5 Drawing Sheets

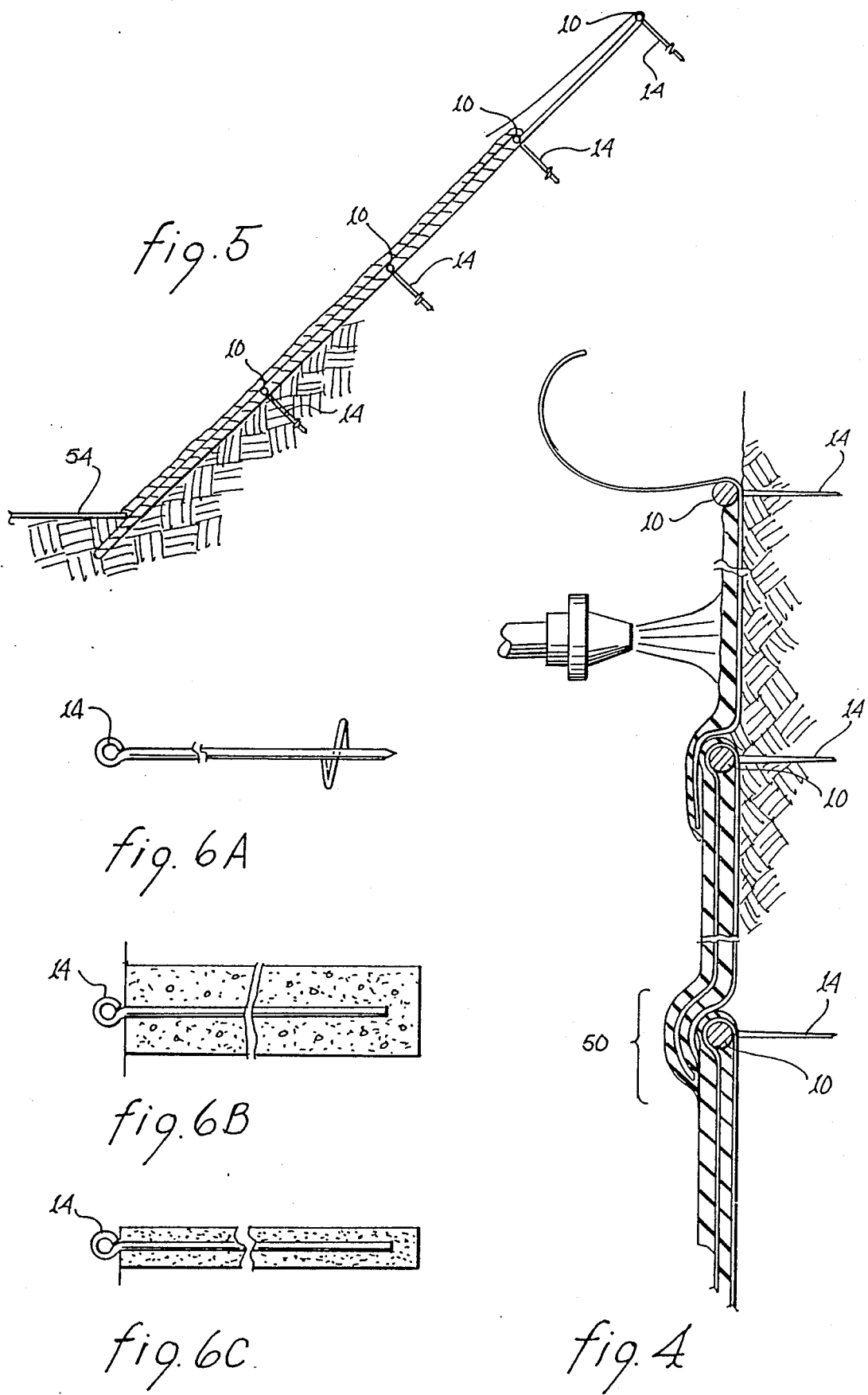

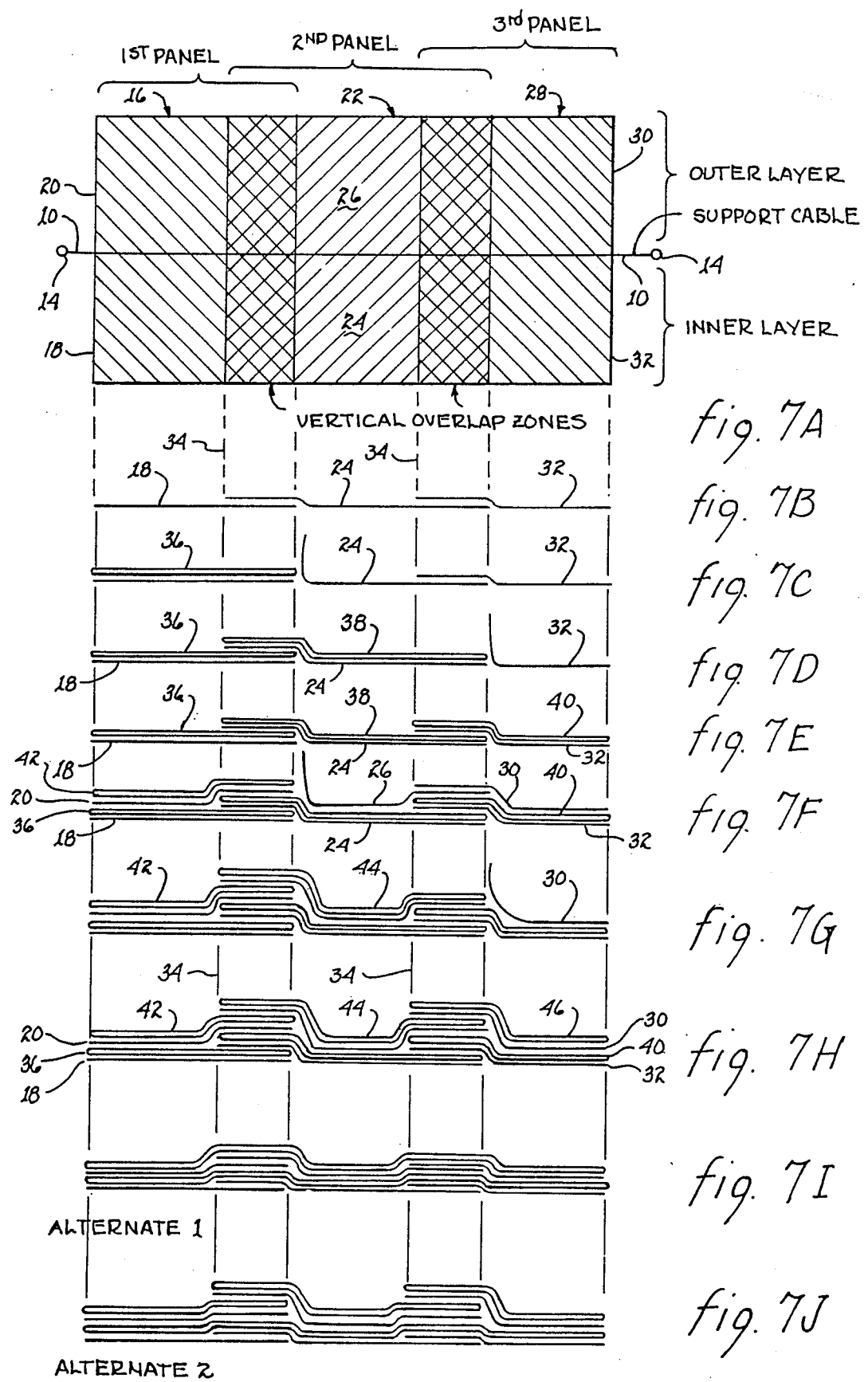

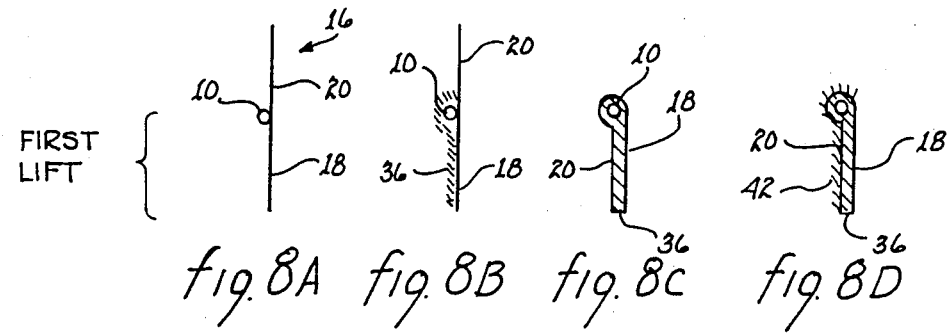
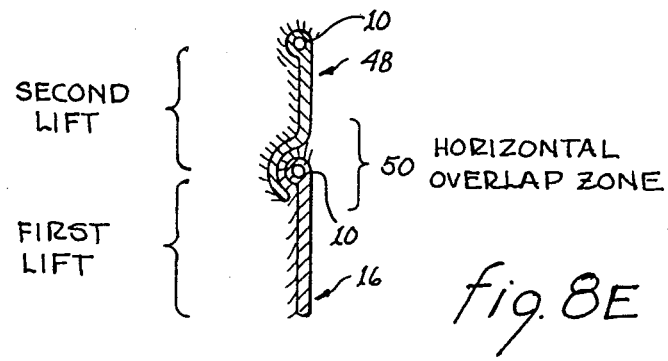
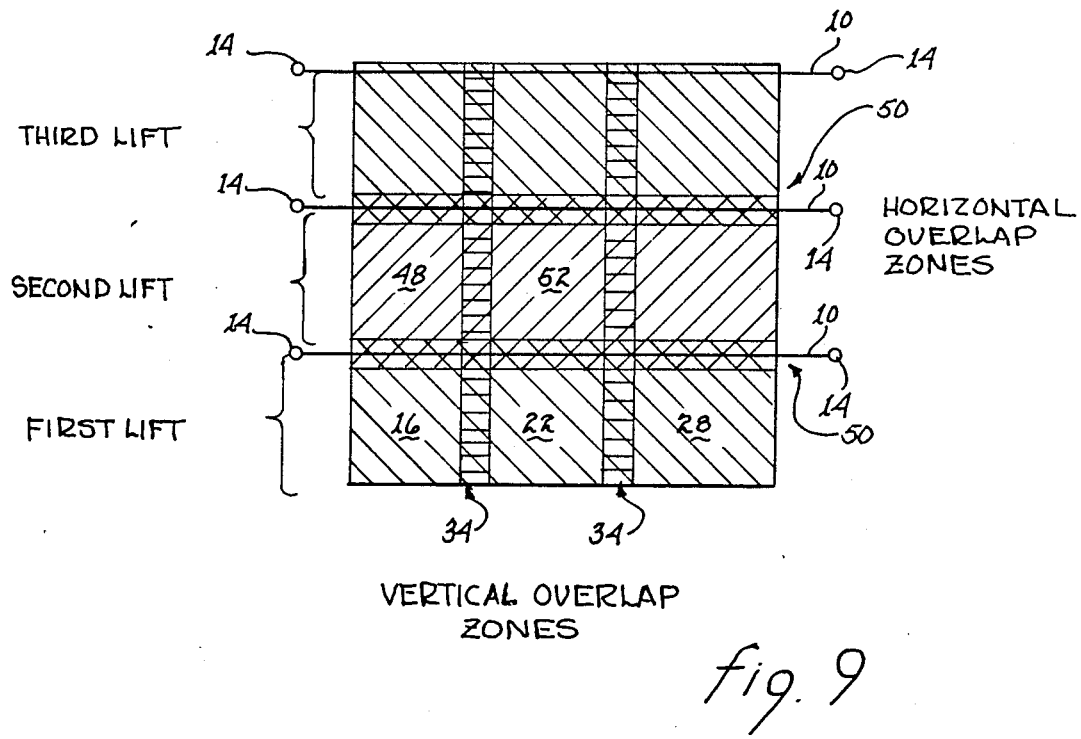

STRESS ABSORBING JOINT

UNSTRESSED JOINT

FLUID IMPERVIOUS, MULTIPLE PANEL LINING SYSTEM

BACKGROUND OF THE INVENTION

1. Field of the Invention

This invention relates to fluid impervious lining systems, and more particularly, to fluid impervious lining systems formed from multiple panels.

2. Description of the Prior Art

Severe environmental problems have resulted from ground water contamination caused by chemical leakage from garbage dumps or by rainwater falling onto and rinsing potentially toxic chemicals or contaminates out of the garbage dump and into the underlying ground water.

In certain areas of the country such as California, fluid impervious lining systems must not only be capable of shielding garbage dumps from rain water and eliminating leakage of toxic wastes, but must also be capable of absorbing physical stresses caused by earthquakes or by differential settlement of the decomposing waste material within the garbage dump.

Many prior art solutions to the above-described problems rely on fluid impervious plastic sheets with seams formed by gluing together the adjacent perimeter edges of such sheets. These plastic sheets are strong but can be readily perforated by sharp objects which are frequently found in garbage dumps. The glued joints of these plastic sheet liners are highly troublesome in that unless the joints are cleaned perfectly before glue application a proper bond will not result and fluid leakage paths will remain.

Similar problems are presented with fluid impervious liners for ponds, water reservoirs or irrigation canals. Due to settlement of the earth or uneven compaction accomplished during construction, the supporting walls of such water retaining basins may move with time, causing membrane or joint failure and fluid leakage. Membrane repairs are expensive because the leakage sites must be exposed, cleaned and resealed.

SUMMARY OF THE INVENTION

It is therefore a primary object of the present invention to provide a fluid impervious, multiple panel lining system which includes stress absorbing joints around the entire perimeter of each panel in combination with a water impervious panel material on which a flexible or yieldable sealant is placed to provide a yieldable and stress absorbing water impervious surface.

Another object of the present invention is to provide a fluid impervious, multiple panel lining system which can readily be expanded either laterally or vertically.

Another object of the present invention is to provide a fluid impervious, multiple panel lining system which provides both vertically and horizontally oriented stress absorbing joints each including a plurality of overlapping panel edges sealed together with multiple layers of a yieldable sealant.

Another object of the present invention is to provide a fluid impervious, multiple panel lining system which is capable of absorbing vertical, horizontal, inward or outward stresses and the resulting physical displacements without leaking.

Another object of the present invention is to provide a fluid impervious, multiple panel lining system which includes a panel formed with an open mesh network for enabling sealant to pass through an outer panel layer and to be sealed to and supported by a sealant layer coupled to an inner panel layer.

Briefly stated, and in accord with one embodiment of the invention, a fluid impervious, multiple panel lining system is positioned adjacent to and supported by an inclined support surface. A horizontally extending support cable is positioned adjacent to the inclined support surface. Each of a plurality of spaced apart anchors is secured to the inclined surface and the support cable for maintaining the support cable at a fixed vertical elevation and for transferring loads imposed on the support cable to the inclined support surface. A foldable panel includes an open mesh network and is draped over and supported from above by the support cable. Each panel includes an inner layer contacting the inclined surface and an outer layer which is placed above and overlaps the inner layer. A first sealant layer is sealed to and supported by the mesh network of the inner layer of the panel. A second sealant layer is sealed to and supported by the mesh network of the outer layer of the panel and by the first sealant layer. A series of stress absorbing joints created within a vertical overlap zone provide a fluid impervious seal between the vertically oriented edges of laterally adjacent panels. A series of horizontally oriented stress absorbing joints are provided within the horizontal overlap zones between the overlapping edges of a first series of laterally aligned panels and a second series of laterally aligned panels placed above the first series of panels.

DESCRIPTION OF THE DRAWINGS

The invention is pointed out with particularly in the appended claims. However, other objects and advantages together with the operation of the invention may be better understood by reference to the following detailed description taken in connection with the following illustrations, wherein:

FIG. 4 is a partially cutaway sectional view showing the sequence of installation of the lining system of the present invention on a vertically inclined surface.

FIG. 5 is a sectional view showing the installation of the lining system of the present invention on a support surface having about a 45° of angle of inclination.

FIGS. 6A-6C depict a variety of different anchors and anchor systems for use in connection with the present invention.

FIGS. 7A-7J sequentially illustrate how three laterally adjacent panels are sequentially manipulated and sprayed with sealant to create the fluid impervious, multiple panel lining system of the present invention.

FIGS. 8A-8E sequentially illustrate how a stress absorbing joint is created within a horizontal overlap zone between vertically adjacent panels.

FIG. 9 depicts a fluid impervious, multiple panel lining system formed as a nine panel grid.

DESCRIPTION OF THE PREFERRED EMBODIMENT

In order to better illustrate the advantages of the invention and its contributions to the art, a preferred hardware embodiment of the invention will now be described in some detail.

Figure 1:
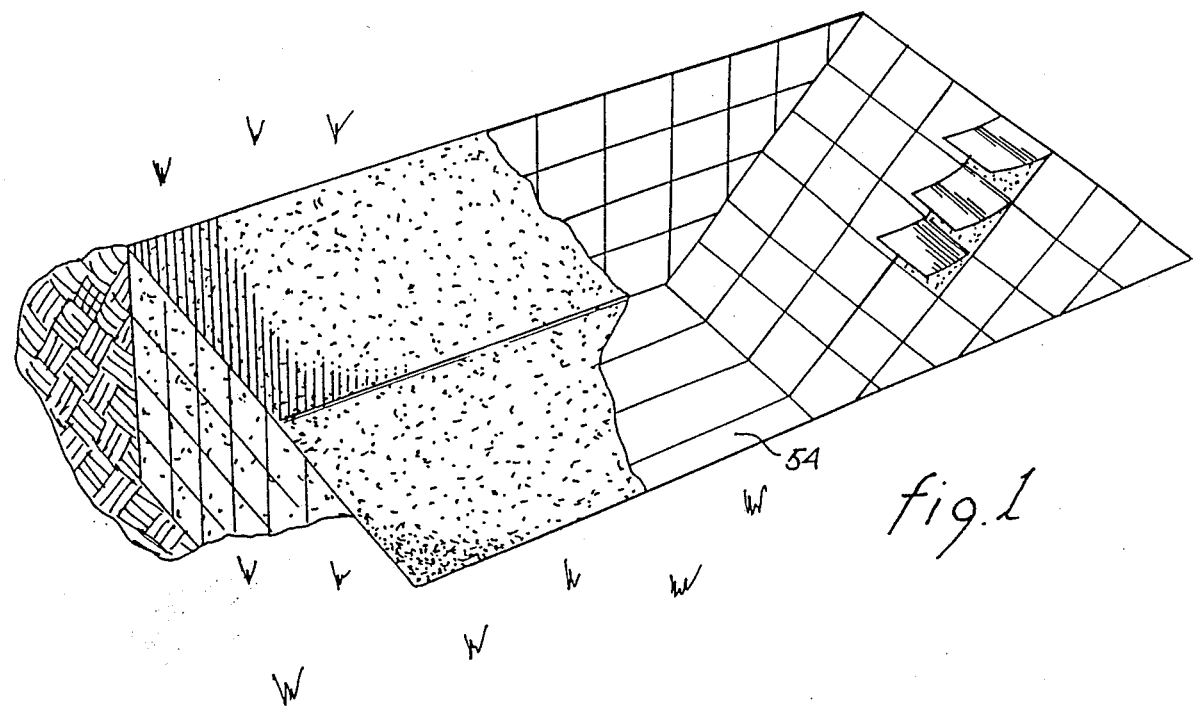
FIG. 1 represents a partially cutaway perspective view of one embodiment of the fluid impervious, multiple panel lining system of the present invention.
Figure 2:
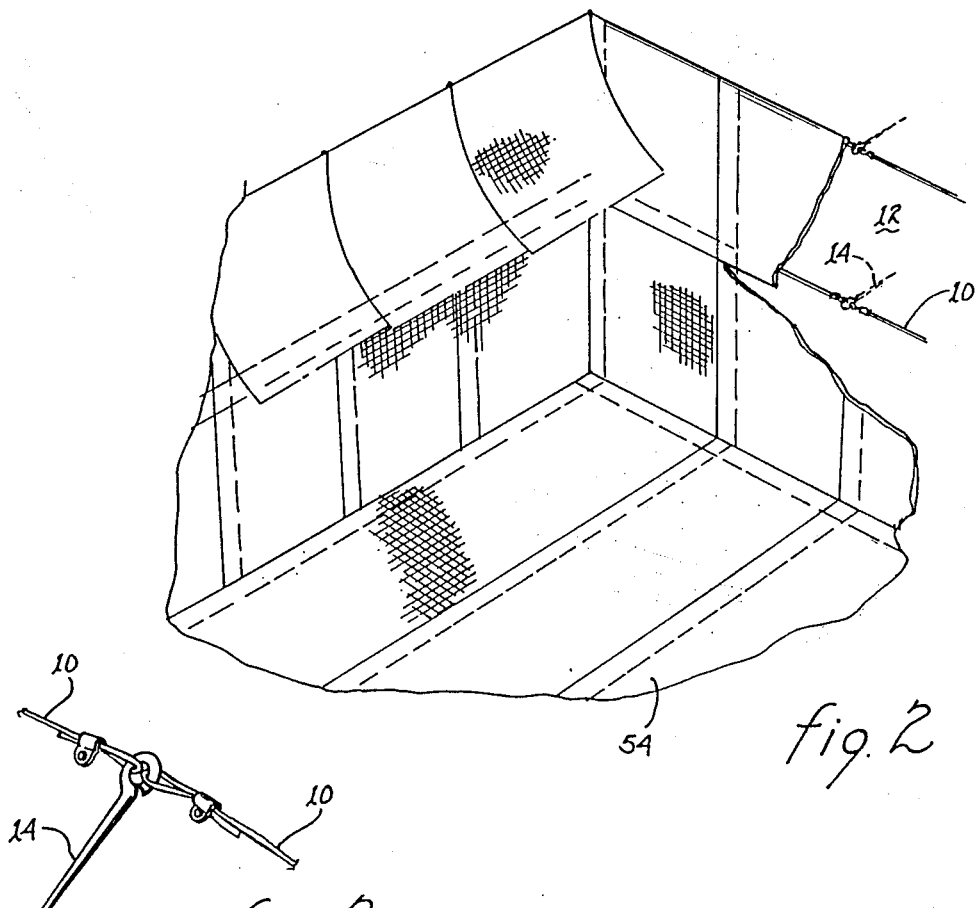
FIG. 2 represents a partially cutaway perspective view of a portion of a fluid impervious, multiple panel lining system of the present invention with vertically oriented side walls.
Figure 3:
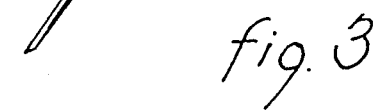
FIG. 3 is a partially cutaway perspective view depicting one type of anchor used in connection with the present invention where the ends of two support cable segments are joined together.
Figure 11A:
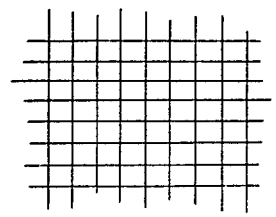
FIGS. 11A-11B depict the open mesh network of a foldable panel.
Figure 11B:
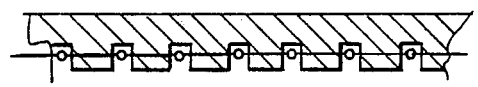

Referring now to FIGS. 1, 2 and 7, one embodiment of the multiple panel lining system of the present invention is formed from a plurality of generally rectangular foldable panels having a woven open mesh network as depicted in FIG. 11A. FIG. 7A represents a view from above of a multiple panel lining system formed from a first panel, a second panel, and a third panel which have been placed laterally adjacent to each other. A support cable 10 extends horizontally and is positioned adjacent to an inclined support surface 12 as illustrated in FIG. 2.

A plurality of spaced apart anchors 14 are coupled at spaced apart intervals to support cable 10. Each anchor is secured to inclined support surface 12 and to support cable 10 to maintain the support cable at a fixed vertical elevation and to transfer loads imposed on the support cable to the inclined support surface 12.

Each panel is sequentially routed between support cable 10 and support surface 12 and is then folded and draped over support cable 10. This initial installation step divides first panel 16 about a vertical midsection into an inner layer 18 lying below the vertical midsection and an outer layer 20 lying above the vertical midsection. Second panel 22 is similarly divided into an inner layer 24 and an outer layer 26. The same is true for third panel 28 which is divided into inner layer 30 and outer layer 32.

FIGS. 7B-7H sequentially illustrate how sealant is applied to panels 16, 22 and 28 to create the fluid, impervious, multiple panel lining system of the present invention.

FIG. 7B illustrates how the adjacent vertical edges of inner layers 18 and 24 of panels 16 and 22 are overlapped within vertical overlap zones 34. Outer layers 20, 26 and 30 of these three panels are maintained above and out of the way of inner layers 18, 24 and 32 at this time.

As illustrated in FIG. 7C, a first sealant layer 36 is spray applied to the mesh network of inner layer 18. First sealant layer 36 extends across the full width of first panel 16 to the right hand side of vertical overlap zone 34. The left hand edge of inner layer 24 of second panel 22 is lifted up and moved out of the way as illustrated in FIG. 7C such that the application of first sealant layer 36 within the vertical overlap zone will not at this time simultaneously seal that edge of inner layer 24 to the adjacent vertical edge of panel 16.

In the preferred embodiment of the invention described above, a molten asphalt rubber or polymer modified asphalt rubber composition is applied by a wand or equivalent spray application device in the molten state at a temperature typically between 375° F. and 400° F. A suitable polymer modified asphalt rubber composition is commercially available from Crafco, Inc. of Chandler, Ariz. and is designated as Crafco Waterproofing Membrane No. 34512. Such sealant materials maintain a semisolid state at ambient temperatures and must be heated, mixed and applied by specialized heating equipment such as a Crafco BC-220 which spray applies such sealants under pressure. A sealant softening point rating on the order of about 175° F. is preferred to prevent runoff of the sealant due to exposure to solar heating.

Acceptable asphalt rubber sealant materials typically have a ground tire rubber content of from about 9% to about 25%. Improved performance and membrane strength and yieldability can be achieved when a polymer, such as Shell's Kraton 1101 SBS polymer, is added to the asphalt rubber such that the polymer content varies from as low as about 1.5% to as high as about 6%.

Suitable sealant materials must have a sufficiently high slump and viscosity rating such that an appropriate thickness of sealant on the order of approximately 300 mills may be sprayed on to and retained on the inclined open mesh network of each panel. Some sealant runoff will occur, but it is important to the proper functioning of the invention that a comparatively uniform sealant thickness be retained across the full width and full height of each panel after the initial spray application.

Plain asphalt has insufficient internal cohesive strength, an inadequate slump rating and an insufficiently low softening point rating to serve as an acceptable sealant for use with the present invention.

The first sealant layer 36 typically cools down and cures adequately in a matter of seconds so that run off stops and the sealant layer permanently maintains the stabilized state illustrated in FIG. 7C. At that time, the lifted left vertical edge of the inner layer 24 of adjacent panel section 22 is dropped down over the edge of first sealant layer 36 within the vertical overlap zone 34. The spray operator now applies first sealant layer 38 to the inner layer 24 of adjacent panel 22 as illustrated in FIG. 7D. During the course of this spray application, the adjacent vertical edge of the inner layer 32 of panel 28 is lifted up and away from the spray application zone as illustrated in FIG. 7D.

FIG. 7E illustrates that first sealant layer 40 is applied to the inner layer 32 of adjacent panel 28 in the same manner as described above.

FIG. 7F illustrates that outer layer 20 of first panel 16 is subsequently dropped down over and placed in contact with first sealant layer 36 at which time a second sealant layer 42 is spray applied over outer layer 20. The open mesh network of outer layer 20 of panel 16 permits second sealant layer 42 to both cover that outer layer and to penetrate through and seal with the previously applied sealant which forms first sealant layer 36. The high spray application temperature of second sealant layer 42 increases the temperature and melts the outer surface of first sealant layer 36 so that a homogeneous, adhesive bond is formed between first sealant layer 36 and second sealant layer 42. This characteristic of the present invention tightly couples together inner layer 18 and outer layer 20 of panel 16 and substantially reinforces and strengthens the resulting multilayer panel structure.

As illustrated in FIG. 7F, the adjacent vertical edge of outer layer 26 of second panel 22 is lifted up within vertical overlap zone 34 as first sealant layer 42 is applied as was done during the application of the first sealant layer 36 as illustrated in FIG. 7C.

FIG. 7G illustrates the next sequential step involving the application of second layer 44 over outer layer 26 of second panel 22.

FIG. 7H shows the final step of applying second sealant layer 46 above outer layer 30 of third panel 28. As illustrated in FIG. 7H, a stress absorbing joint has now been created within each vertical overlap zone 34 by the four adjacent vertically oriented edges of the inner and outer layers of adjacent panels and by four alternating sealant layers which yieldably couple together the panel edges.

FIG. 7I illustrates a first alternative stress absorbing joint design where the first and second sealant layers are not interrupted within the vertical overlap zones so that only two spaced apart sealant layers join together the four vertically overlapping edges of adjacent panels. The use of an open mesh network in the panel enables the sealant when applied in the molten state to penetrate through not only the immediately adjacent panel section within each vertical overlap zone, but to also penetrate through the second underlying panel layer. The overall strength of the stress absorbing joint depicted in FIG. 7I utilizing only two uninterrupted sealant layers is adequate, but somewhat less than the strength and stress absorbing capability of the stress absorbing joint depicted in FIG. 7H where four layers of sealant both separate and couple together the four adjacent panel edges within each vertical overlap zone.

FIG. 7J illustrates a second alternative for the stress absorbing joint of the present invention where the first sealant layer is not interrupted within the vertical overlap zone, but the second sealant layer is interrupted in that zone. In this embodiment of the invention, only the overlapping inner layers of adjacent panels are not separated and adhesively coupled together by a discrete sealant layer. This second alternative stress absorbing joint configuration is also suitable but will possess somewhat less strength and yieldability than the four sealant layer stress absorbing joint illustrated in FIG. 7H.

FIG. 9 represents a schematic representation of a fluid impervious, multiple panel lining system formed as a nine panel grid. In connection with FIG. 7, the manner in which three laterally adjacent panels are secured to and supported by a single support cable 10 to form a three panel lining system has been described. Now by referring to FIGS. 8 and 9, the manner in which additional support cables can be secured by anchors 14 to inclined surface 12 to create a second lift, a third lift or higher lifts to thereby increase the overall vertical height of the lining system will be described in detail. The reference numbers used in FIG. 8 will generally correlate with the reference numbers used with FIG. 7.

FIG. 8A represents a side view of the lining system showing inner layer 18 and outer layer 20 of first panel 16 which are generally equalized in length about support cable 10. FIG. 8B illustrates that the first sealant layer 36 has been sprayed applied to the exposed outer surface of inner layer 18. As illustrated in FIG. 8B, sealant should be sprayed around cable 10 to seal the outer surface of the cable to prevent corrosion or damage to the cable by environmental elements.

After first sealant layer 36 has cured for a few seconds, outer layer 20 can be dropped down as shown in FIG. 8C so that it contacts sealant layer 36.

As illustrated in FIG. 8D, second sealant layer 42 is then applied as was described in connection with FIG. 7F.

FIG. 8E illustrates how a second lift or second vertical section of the multiple panel lining system of the present invention is created. Panel 16 and the two sealant layers create the first lift or first vertical section of the lining system. A second horizontally oriented support cable 10 is then anchored to the underlying support surface 12 at an elevation vertically spaced above the original support cable 10 as illustrated in FIG. 8E. The vertical spacing between support cables 10 is selected such that the lower ends of panel 48 will overlap the underlying support cable and the upper part of panel 16 as illustrated. The sequence of steps required to apply the two sealant layers to panel 48 is identical to that described in connection with FIGS. 8A-8D above.

As illustrated by FIG. 8E and by FIG. 9, the resulting horizontally oriented four layer overlap zone is designated as horizontal overlap zone 50. This horizontally extending overlap zone, as was the case with vertical overlap zones 34, typically includes four overlapping panel layers separated by four spaced apart sealant layers. The resulting structure of the horizontal overlap zone 50 differs from the vertical overlap zone 34 in that the horizontal overlap zone includes paired layers from a single panel which are positioned immediately adjacent to each other. For the vertical overlap zone 34, the four panel layers were alternately interleaved and were provided from adjacent panel sections.

With horizontal overlap zone 50, support cable 10 tends to maintain the innermost two layers of the overlap zone in a more fixed position while permitting a greater degree of movement or flexibility of the outermost two joint layers from the higher level panel 48.

FIG. 9 clearly illustrates the manner in which the vertical overlap zones 34 and the horizontal overlap zones 50 function to seal together the entire perimeter of individual panel sections such as panel 52. Since each horizontal overlap zone 50 functions as a stress relieving joint as was described above for vertical overlap zones 34, any stress placed upon a panel such as panel 52 can be absorbed within both the vertical and the horizontal overlap zones. Small magnitude stress-induced panel displcements are initially absorbed by the yieldable nature of the open mesh network of the panel itself. For greater stress-induced displacements imposed on a particular panel, the yield limit of the panel mesh will be reached and further displacements will be transmitted to one or more adjacent stress relieving joints and will be absorbed within the joint by elastic expansion of the sealant within each joint and by resulting physical movement of the panel within each joint. This stress absorbing feature of the present invention is illustrated in FIG. 10.

Figure 10A:
FIGS. 10A-10B represent sectional views depicting how stresses are absorbed within a joint formed within a vertical overlap zone.
Figure 10B:
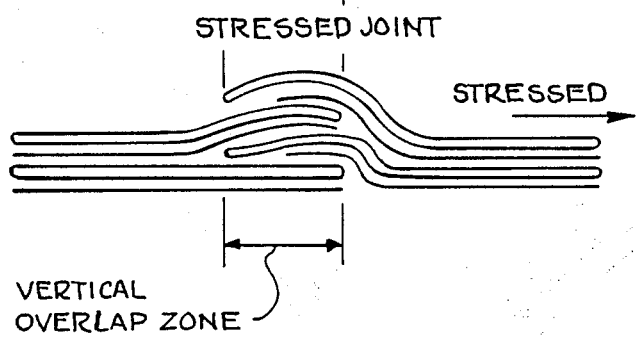

FIG. 10A illustrates a stress absorbing joint formed within a vertical overlap zone in the unstressed state as the joint was initially fabricated. As illustrated in FIG. 10B, physical displacement of the right hand or second panel physically displaces the entire panel to the right and stretches the sealant of the stress absorbing joint within the vertical overlap zone. Although FIG. 10B illustrates no relative movement of the first or left hand panel relative to the vertical overlap zone 34, some relative lateral movement of the first panel to the right in response to right hand displacement of the second panel will occur.

The highly elastic Crafco polymer modified asphalt rubber sealant material can sustain an elongation of up to seven hundred percent and rebound to its original position without breaking. In response to a stress of the type illustrated in FIG. 10B, this sealant will permit the panel material of the second panel to move or be displaced relative to the panel material of the first panel while maintaining a tightly coupled, fluid tight joint over an extremely wide range of ambient temperatures. Even after the application of such stresses for a long time, the sealant material will not tear or perforate.

Although FIG. 10 specifically illustrates the stress absorbing properties of a stress absorbing joint of the present invention within a vertical overlap zone, an essentially similar stress absorbing mechanism occurs in stress absorbing joints formed within the horizontal overlap zones of the type illustrated in FIG. 8E.

The multiple panel lining system of the present invention can be fabricated with a variety of different dimensions. In the embodiment of the invention illustrated in FIGS. 1, 2, 4 and 5 which is primarily intended to function as an expanded water impervious lining system for a garbage dump, the support cables 10 are separated to create ten foot high lifts and a panel width of ten feet is utilized. Side to side overlap between laterally adjacent panel sections is determined by the anticipated stress absorbing requirements of the joints. For typical garbage dump applications, a twelve inch side to side overlap within each vertical overlap zone should be satisfactory. For the horizonal overlap zones, a twelve to eighteen inch overlap should be satisfactory. For greater stress absorbing capabilities, greater overlap distances may be utilized. For less stress absorbing capability, the panel edge overlap within the vertical and horizontal overlap zones may be reduced.

Careful selection of the material used as the foldable panels of the present invention is necessary when asphalt rubber or polymer modified asphalt rubber sealant materials are used and applied at 375° to 400° F. The panel material must be capable of sustaining these high application temperatures within melting, shrinking or otherwise failing. One specific material having properties compatible with asphalt rubber or polymer modified asphalt rubber sealant materials is a heat set polyester material (400° F.) described as a weave stabilized netted marquisette fabric (Style No. D34) which is commercially available from the Apex Mills Company of New York. The heat treatment of this panel material preshrinks it and welds the perpendicular strands of the polyester mesh network together. The resulting heat set polyester mesh has an extremely high tensile strength and is readily able to withstand the high sealant application temperatures without shrinking or failing. Non-heat set polyester materials shrivel up in response to the application of the high temperature sealant and do not work well.

One of the primary objectives of the present invention is to create a lining system which is not only capable of absorbing stresses, but which is also fluid impervious and damage resistant. For garbage dumps particularly, toxic chemicals may leak downward or be washed downward by rain water and ultimately contaminate and render unsuitable the ground water sources lying under the garbage dump.

It is therefore necessary to create a fluid impervious membrane or liner which completely surrounds material deposited in a garbage dump to prevent ground water contamination. An embodiment of the present invention suitable for use as a garbage dump liner is illustrated in FIGS. 1, 2, 4 and 5.

The horizontally oriented base of a garbage dump illustrated in FIGS. 1 and 5, may be rendered water impervious by applying a layer of hard packed clay as illustrated in FIG. 5. Alternatively, a series of mesh panels or elongated rectangular sections of mesh panels may be formed as illustrated in FIGS. 1 and 2 to create a horizontally oriented multiple panel lining system of the present invention. Because this different embodiment of the present invention is horizontally oriented and does not require anchors or horizontally oriented support cables for vertical support, the support cable and anchor elements of the present invention may be omitted in the garbage dump base membrane or in its top cover membrane. The series of panels used to create a water impervious base for a garbage dump may be formed by creating a series of four layer overlapping joints as was described in detail in connection with FIGS. 7 and 8. When used as a base liner for a garbage dump or other system each panel will possess a stress absorbing joint extending around its entire perimeter.

When highly elongated rectangular panels are used as illustrated in FIG. 2, the stress absorbing capability of the present invention is decreased. It is therefore typically desirable to limit the maximum length of each panel section to enhance the stress absorbing properties of the stress absorbing joints at the sides of each panel.

In the embodiment of the invention illustrated in FIG. 5, the lowermost section of the lowermost panel designated by reference number 56 penetrates approximately two feet below the upper surface of the clay base 54 to form a fluid impervious seal between base 54 and panel 56. In the embodiments of the invention illustrated in FIGS. 1 and 2, a lapped joint is created between the vertical and horizontally oriented panels in the same manner as was described above in connection with FIGS. 7 and 8.

When asphalt rubber or polymer modified asphalt rubber sealants are used, an application rate of from about 0.6 to about 1.0 gallons per square yard should be used to create both the first and second sealant layers. A typical sealant depth on the order of about one hundred to three hundred mills or greater functions very well. Either greater or lesser sealant application rates or greater or lesser sealant thicknesses can be used to provide for either enhanced or diminished lining system strength and durability. When applied at the rates previously described, the sealant will be adequately thick to provide a self-sealing function such that it will flow around and seal to an object which causes a tear or perforation in the membrane.

The overall resistance of the lining system of the present invention to tears or punctures is directly related to the tensile strength of the material used for the panel. The one hundred percent polyester fabric described above in connection with the preferred embodiment of the invention possesses a ball burst strength of one hundred and ten pounds per square inch, a thickness of 0.02 inches, a weight of 2.4 ounces per square yard and ends count of twelve wales by thirty-six courses per inch. The warp strength of this material is fifty pounds per lineal inch; its fill strength is fifty-five pounds per lineal inch.

To create a lining system within the scope of the present invention, an open mesh panel formed from chicken wire, other woven wires, hardware cloth, chain link fence or equivalent material may be utilized. In most applications, the large mesh network or large aperture size of material or large thickness ratings such as is common with chain link fence will be unsuitable and sealant application rates may have to be increased substantially to maintain and preserve the fluid impervious nature of the lining system. Nevertheless, such metallic panels may in certain applications provide a suitable lining system. An open mesh fiberglass panel material may also be satisfactory as long as it is capable of being folded and draped over supporting cable 10 without fracturing along the fold. If such fracturing occurs along the fold, the ability of the folded panel to be retained and supported from above by the support cable will be degraded or lost and the overall lining system will be prone to failure.

Once the interior volume created by the lining system has been filled with material, the weight of the contained material exerted through the lining system onto the underlying support surface will be adequate to maintain each panel of the lining system at a fixed vertical elevation and it may no longer be necessary to rely upon a vertical load bearing support as provided by the support cables 10.

Figure 12:
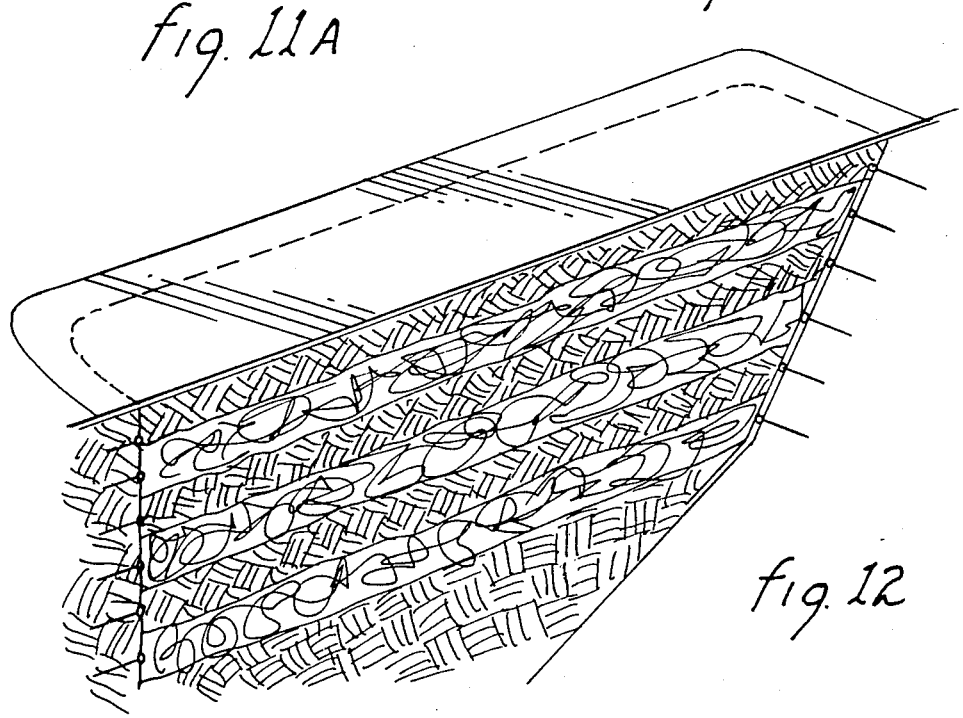
FIG. 12 represents a partially cutaway perspective view showing the fluid impervious, multiple panel lining system of the present invention installed to seal the contents of a multiple layer garbage dump.

Referring now to FIG. 12, a fully filled garbage dump is illustrated with fluid impervious side walls formed according to the present invention. The exposed top of the garbage dump can then be sealed by a single thickness of spray applied sealant without panels or by the multiple panel system described in connection with FIGS. 1 and 2 which sealed the base of the pit. On installations used to cover the upper surface of a garbage dump, the cable and anchor network may be omitted since it is not necessary to provide vertical support for a horizontally oriented upper surface.

As illustrated in FIG. 12, the provision of a sealed base, a sealed upper surface and sealed side walls creates an essentially seamless, sealed envelope which prevents leakage of potentially toxic fluids out of the interior of that envelope and as well prevents the introduction of rainwater into the interior of the envelope. Because of the two fold protection provided by the lining system of the present invention, underlying ground water is completely protected from contamination. In addition, methane gas is retained within the sealed envelope and may be drawn off through a controlled outlet and stored or used.

In other embodiments of the invention, sealants other than asphalt rubber and polymer modified asphalt rubber may be utilized. Such asphalt and rubber based sealants are not fuel resistant and may not be satisfactory for use in connection with other varieties of toxic materials such as acids. When a fuel resistant lining system is necessary, a sealant in the form of a rubber modified coal tar emulsion or rubber modified PVC may be applied to serve a sealing function similar to that described in connection with asphalt rubber and polymer modified asphalt rubber. Coal tar base sealants such as Crafco Super Seal 777 either with or without a PVC additive may be substituted for an asphalt rubber type sealant and have the added benefits of being fuel resistant.

Other sealants such as polyvinyl chloride and silicone as well as other well known sealants may be used to function as stress absorbing sealant material in accordance with the teachings above.

A very significant advantage derived from the use of asphalt rubber and polymer modified asphalt rubber sealants is the ability of such materials to provide a highly satisfactory, flexible, leak proof joint on panel material contaminated by dirt or debris. Other types of sealants such as silicone function properly only on clean, dry surfaces.

In many lining system applications, serious membrane failures are caused by differential settlement. In a garbage dump such as that illustrated in FIG. 12, a variety of materials are mixed together and decay at very different rates over time. For example, the left hand vertical side wall of the garbage dump illustrated in FIG. 12 may be installed adjacent to a side wall formed by dirt, concrete debris, tree limbs, lumber and sawdust. The organic tree limbs, lumber and sawdust decay rapidly with time and ultimately occupy a substantially reduced volume in comparison to the inert dirt and concrete. As a result of forces exerted from the interior of the membrane through the membrane itself into a void created by differential settlement, the panels and stress absorbing joints of the liner system may have to accommodate substantial lateral or downward displacements without failure of the fluid tight integrity of the sealed membrane.

With the lining system of the present invention, initial panel displacements caused by differential settlement may be accommodated by the open mesh network of the panel. For greater displacements caused by differential settlement, further stresses are imposed on the lining system and are absorbed in the vertical and horizontal stress absorbing joints as illustrated in FIG. 10. Such absorption of stress can occur around the perimeter of each individual panel and can be further transmitted to and absorbed by other stress absorbing joints positioned around the perimeter of adjacent panels. Even if a panel is perforated, the sealant will stick to and form a seal around the object causing the perforation and will thereby maintain the fluid tight integrity of the lining system.

In typical garbage dump applications, the lining system of the present invention will be built one vertical lift at a time. Similarly, the overall width of the lining system may be initially fabricated with a small dimension and subsequently expanded as needed. As garbage is brought in and fills up the garbage dump to a higher level, a second lift can be built. When the garbage dump nears the top as illustrated in FIG. 12, the final lift can be built and ultimately the top layer can be sealed as previously described. As the overall width of the garbage dump is enlarged, additional support cables 10 can be added at the same elevation as the existing support cable 10 and additional panels can be laterally joined to existing panels to thereby substantially expand the overall area sealed by the liner system of the present invention.

The proximity of anchors 14 is controlled to a large extent by the strength and rigidity of the underlying support material. For an application of the lining system of the present invention in a granite or rock lined quarry, a comparatively great spacing between adjacent anchors 14 can be provided. In comparatively soft material such as the sides of an existing garbage dump, the anchors 14 must be placed more closely together to prevent excessive loads from being placed upon any single anchor.

The vertical elevation of each lift can be controlled in response to the load bearing capabilities of the underlying support surface.

In order to maximize the stress absorbing capability of the liner system of the present invention, the height of each lift may be reduced and the width of each panel may be reduced to reduce or minimize the perimeter of each panel section and to thereby reduce the distance between any point of stress and the most remote stress absorbing joint on the perimeter of each panel. For a liner system where very little stress is expected, the width of the panels can be increased and the height of each lift can be increased without jeopardizing the fluid impervious characteristics of the present invention. In an area highly susceptible to earthquakes, a ten foot lift height and a ten foot panel width or less could be chosen to maximize the stress absorbing capability of the completed lining system.

It will be apparent to those skilled in the art that the disclosed lining system may be modified in numerous ways and may assume many embodiments other than the preferred forms specifically set out and described above. For example, rather than using a steel cable 10 passing through a pocket formed by folding the outer panel layer over the inner panel layer, a linear support device or a series of downwardly extending cables may be positioned above the top of a folded panel and interconnected by a series of downwardly extending fasteners, clips, or other devices capable of transferring loads from the panel upward to an anchor or other load transfer device. In another alternative, a series of very closely spaced anchors may be driven through the upper extremity of each folded panel to serve precisely the same function as that served by the supporting cable 10 plus the spaced apart anchors 14 of the present invention. The key concept of this aspect of the present invention relates to the transfer of loads imposed on the panel to the inclined support surface by a fastening device connected to the upper surface of the folded panel. According, it is intended by the appended claims to cover all such modifications of the invention which fall within the true spirit and scope of the invention.

I claim:

1. A fluid impervious, multiple panel lining system positioned adjacent to a support surface, comprising:
 a. a first generally rectangular foldable panel with an open mesh network, an inner layer contacting the support surface and an outer layer placed above and overlapping the inner layer, the inner layer and the outer layer each having an upper surface;
 b. a first sealant layer sealed to and supported by the mesh network of the inner layer of the panel;
 c. a second sealant layer sealed to and supported by the mesh network of the outer layer of the panel and sealed to and supported by the first sealant layer;
 d. a second generally rectangular foldable panel with an open mesh network, an inner layer contacting the support surface and an outer layer placed above and overlapping the inner layer, the second panel having a lower surface extending below and overlapping the upper surface of the outer layer of the firsft panel to create a horizontal overlap zone;
 e. a third sealant layer sealed to and supported by the mesh network of the inner layer of the second panel; and
 f. a fourth sealant layer sealed to and supported by the mesh network of the outer layer of the second panel and sealed to and supported by the first sealant layer.

2. The fluid impervious, multiple panel lining system of claim 1 wherein the third sealant layer extends to a level below the upper surface of the first panel and is sealed to the second sealant layer of the first panel.

3. The fluid impervious, multiple panel lining system of claim 2 wherein the horizontal overlap zone includes a four layer overlap zone and wherein the fourth sealant layer extends to a level below the upper surface of the third panel and is sealed to the third sealant layer.

4. The fluid impervious, multiple panel lining system of claim 3 wherein a stress relieving joint is formed between the first and second panels and wherein elongation of the sealant within the stress relieving joint enables the first and second panels to move relative to each other.

5. The fluid impervious, multiple panel lining system of claim 4 wherein an asphalt and rubber composition forms the first, second, third and fourth sealant layers.

6. A fluid impervious, multiple panel lining system positioned adjacent to and supported by a support surface, comprising:
 a. a first generally rectangular foldable panel with an open mesh network, first and second vertical edges, an inner layer contacting the support surface and an outer layer placed above and overlapping the inner layer;
 b. a second generally rectangular foldable panel with an open mesh network having first and second vertical edges, an inner layer contacting the inclined surface and an outer layer placed above and overlapping the inner layer, the second panel being laterally aligned with respect to the first panel such that the adjacent vertical edges of each panel overlap to create a vertical overlap zone;
 c. a first sealant layer sealed to and supported by the mesh network of the inner layers of the first and second panels, the first sealant layer extending into the vertical overlap zone and sealing the inner layer of the first panel to the inner layer of the second panel; and
 d. a second sealant layer for covering the outer layers of the first and second panels and for sealing together the adjacent vertical edges of the outer layers of the first and second panels within the vertical overlap zone.

7. The fluid impervious, multiple panel lining system of claim 6 wherein the second sealant layer penetrates through the mesh network of the first and second panels and bonds with the first sealant layer.

8. The fluid impervious, multiple panel lining system of claim 7 wherein the first and second sealant layers are formed from a sealant which forms a yieldable bond at ambient temperature.

9. The fluid impervious, multiple panel lining system of claim 8 wherein the first and second sealant layers are applied in a hot, molten state to the first and second panels and wherein the first and second panels are fabricated from a material which melts at a temperature higher than the molten state temperature of the sealant.

10. The fluid impervious, multiple panel lining system of claim 9 wherein a stress absorbing joint is formed between the first and second panels within the vertical overlap zone and wherein elongation of the sealant within the stress absorbing joint enables the first and second panels to move relative to each other.

11. The fluid impervious, multiple panel lining system of claim 10 wherein two vertical edges of the first panel overlap with two vertical edges of the second panel within the vertical overlap zone to create a four layer stress absorbing joint.

12. A fluid impervious, multiple panel lining system positioned adjacent to and supported by an inclined support surface, comprising:
   a. a horizontally extending support cable positioned adjacent to the inclined support surface;
   b. a plurality of spaced apart anchors each secured to the inclined support surface and to the support cable for maintaining the support cable at a fixed vertical elevation and for transferring loads imposed on the support cable to the inclined support surface;
   c. a first generally rectangular foldable panel with an open mesh network and a vertical midsection draped over and supported from above by the support cable with an inner layer contacting the inclined surface and an outer layer placed above and overlapping the inner layer;
   d. a first sealant layer sealed to and supported by the mesh network of the inner layer of the panel; and
   e. a second sealant layer sealed to and supported by the mesh network of the outer layer of the panel and sealed to and supported by the first sealant layer.

13. The fluid impervious, multiple panel lining system of claim 12 wherein the panel includes a height and a width.

14. The fluid impervious, multiple panel lining system of claim 13 wherein the support cable passes through a pocket between the inner and outer layers of the panel formed by the passage of the midsection of the panel over and around the cable.

15. The fluid impervious, multiple panel lining system of claim 14 wherein the panel is a rectangular panel.

16. The fluid impervious, multiple panel lining system of claim 13 wherein the spacing between adjacent anchors exceeds the panel width.

17. The fluid impervious, multiple panel lining system of claim 12 wherein the panel is fabricated from a heat treated, woven plastic material.

18. The fluid impervious, multiple panel lining system of claim 17 wherein the first and second sealant layers are formed from a sprayable sealant including asphalt and ground tire rubber components.

19. The fluid impervious, multiple panel lining system of claim 18 wherein the sealant also includes a polymer.

20. The fluid impervious, multiple panel lining system of claim 19 wherein the sealant includes from about 1.5% to about 6% polymer.

21. The fluid impervious, multiple panel lining system of claim 20 wherein the sealant includes from about 9% to about 16% ground tire rubber.

22. A fluid impervious, multiple panel lining system positioned adjacent to and supported by an inclined support surface, comprising:
   a. a first horizontally extending support cable positioned adjacent to the inclined support surface;
   b. a first plurality of spaced apart anchors each secured to the inclined support surface at a first elevation and to the first support cable for maintaining the support cable at a fixed vertical elevation and for transferring loads imposed on the support cable to the inclined support surface;
   c. a first generally rectangular foldable panel with an open mesh network draped over and supported from above by the first support cable with an inner layer contacting the inclined surface and an outer layer placed above and overlapping the inner layer, the inner layer and the outer layer each having an upper surface;
   d. a first sealant layer sealed to and supported by the mesh network of the inner layer of the first panel;
   e. a second sealant layer sealed to and supported by the mesh network of the outer layer of the first panel and sealed to and supported by the first sealant layer;
   f. a second horizontally extending support cable positioned adjacent to the inclined support surface at an elevation above the first support cable;
   g. a second plurality of spaced apart anchors each secured to the inclined support surface and to the second support cable for maintaining the second support cable at a fixed vertical elevation and for transferring loads imposed on the second support cable to the inclined support surface;
   h. a second generally rectangular foldable panel with an open mesh network draped over and supported from above by the second support cable with an inner layer contacting the inclined surface and an outer layer placed above and overlapping the inner layer, the second panel having a lower surface extending below and overlapping the first support cable and the upper surface of the outer layer of the first panel to create a horizontal overlap zone;
   i. a third sealant layer sealed to and supported by the mesh network of the inner layer of the second panel; and
   j. a fourth sealant layer sealed to and supported by the mesh network of the outer layer of the second panel and sealed to and supported by the first sealant layer.

23. The fluid impervious, multiple panel lining system of claim 22 wherein the third sealant layer extends to a level below the first support cable and is sealed to and supported by the second sealant layer of the first panel.

24. The fluid impervious, multiple panel lining system of claims 22 or 23 wherein the inner and outer layers of the second panel extend below and overlap the first support cable and the upper surface of the outer layer of the first panel, wherein the fluid impervious, multiple panel lining system includes a four layer overlap zone, and wherein the fourth sealant layer extends to a level below the first support cable and is sealed to and supported by the third sealant layer.

25. The fluid impervious, multiple panel lining system of claim 22 or 23 wherein a stress relieving joint is formed between the first and second panels and wherein elongation of the sealant within the stress relieving joint enables the first and second panels to move relative to each other.

26. The fluid impervious, multiple panel lining system of claim 25 wherein an asphalt and rubber composition forms the first, second, third and fourth sealant layers.

27. A fluid impervious, multiple panel lining system positioned adjacent to and supported by an inclined support surface, comprising:
   a. a first horizontally extending support cable positioned adjacent to the inclined support surface;
   b. a first plurality of spaced apart anchors each secured to the inclined support surface and to the support cable for maintaining the support cable at a fixed vertical elevation and for transferring loads imposed on the support cable to the inclined support surface; c. a first generally rectangular foldable panel with an open mesh network draped over and supported from above by the support cable with first and second vertical edges, an inner layer contacting the inclined surface and an outer layer placed above and overlapping the inner layer;

d. a second generally rectangular foldable panel with an open mesh network draped over and supported from above by the support cable and having first and second vertical edges, an inner layer contacting the inclined surface and an outer layer placed above and overlapping the inner layer, the second panel being laterally aligned with respect to the first panel such that the adjacent vertical edges of each panel overlap to create a vertical overlap zone;

e. a first sealant layer sealed to and supported by the mesh network of the inner layers of the first and second panels, the first sealant layer extending into the vertical overlap zone and sealing the inner layer of the first panel to the inner layer of the second panel; and f. a second sealant layer for covering the outer layers of the first and second panels and for sealing together the adjacent vertical edges of the outer layers of the first and second panels within the vertical overlap zone.

28. The fluid impervious, multiple panel lining system of claim 27 wherein the second sealant layer penetrates through the mesh network of the first and second panels and bonds with the first sealant layer.

29. The fluid impervious, multiple panel lining system of claim 28 wherein the first and second sealant layers are formed from a sealant which forms a yieldable bond at ambient temperature.

30. The fluid impervious, multiple panel lining system of claim 29 wherein the first and second sealant layers are applied in a hot, molten state to the first and second panels and wherein the first and second panels are fabricated from a material which melts at a temperature higher than the molten state temperature of the sealant.

31. The fluid impervious, multiple panel lining system of claim 27 wherein a stress absorbing joint is formed between the first and second panels within the vertical overlap zone and wherein elongation of the sealant within the stress absorbing joint enables the first and second panels to move relative to each other.

32. The fluid impervious, multiple panel lining system of claim 31 wherein an asphalt and rubber composition forms the first and second sealant layers.

33. The fluid impervious, multiple panel lining system of claim 32 wherein two vertical edges of the first panel overlap with two vertical edges of the second panel within the vertical overlap zone to create a four layer stress absorbing joint.

34. The fluid impervious, multiple panel lining system of claim 33 wherein the first and second sealant layers extend into the stress absorbing joint and seal the vertical edges of the first panel to the vertical edges of the second panel.

35. The fluid impervious, multiple panel lining system of claim 34 wherein the first sealant layer is split into a first panel section and a second panel section and wherein the second sealant layer is split into a first panel section and a second panel section.

36. The fluid impervious, multiple panel lining system of claim 35 wherein the first panel section of the first sealant layer extends into the vertical overlap zone below the adjacent vertical edge of the inner layer of the second panel and wherein the second panel section of the first sealant layer extends into the vertical overlap zone above the adjacent vertical edge of the inner layer of the first panel.

37. The fluid impervious, multiple panel lining system of claim 36 wherein the first panel section of the second sealant layer extends into the vertical overlap zone below the adjacent vertical edge of the outer layer of the second panel and wherein the second panel section of the first sealant layer extends into the vertical overlap zone above the adjacent vertical edge of the outer layer of the first panel.

38. The fluid impervious, multiple panel lining system of claim 37 wherein the stress absorbing joint includes four alternating layers of panel and sealant.

39. The fluid impervious, multiple panel lining system of claim 38 wherein the first and second sealant layers are formed from a sprayable sealant including asphalt and ground tire rubber components.

40. The fluid impervious, multiple panel lining system of claim 39 wherein the sealant also includes polymer.

41. A method for creating a fluid impervious, multiple panel lining system positioned adjacent to and supported by an inclined support surface comprising the steps of:

a. providing a first plurality of spaced apart, horizontally aligned anchors and securing each anchor to the inclined support surface;

b. providing a first horizontally extending support cable and securing the support cable to the spaced apart anchors for maintaining the support cable at a fixed vertical elevation and for transferring loads imposed on the support cable to the inclined support surface;

c. providing a first generally rectangular foldable panel with an open mesh network, first and second vertical edges, an inner layer and an outer layer;

d. draping the first panel over the first support cable with the inner layer contacting the inclined surface and the outer layer placed above and overlapping the inner layer;

e. providing a second generally rectangular foldable panel with an open mesh network, first and second vertical edges, an inner layer and an outer layer;

f. draping the second panel over the first support cable with the inner layer contacting the inclined surface and the outer layer placed above and overlapping the inner layer and laterally aligning the second panel with respect to the first panel such that the adjacent vertical edges of each panel overlap to create a four layer vertical overlap zone;

g. spraying a first layer of sealant onto the inner layers of the first and second panels and sealing the inner layer of the first panel to the inner layer of the second panel within the vertical overlap zone; and h. spraying a second sealant layer over the outer layers of the first and second panels and sealing the outer layer of the first panel to the outer layer of the second panel within the vertical overlap zone to define a stress absorbing joint between the first and second panels.

42. The method of claim 41 including the further steps of:

a. providing a second plurality of horizontally aligned, spaced apart anchors and securing each anchor to the inclined support surface at an elevation above the first support cable;

b. securing a second horizontally extending support cable to the second plurality of spaced apart anchors for maintaining the second support cable at a fixed vertical elevation and for transferring loads imposed on the second support cable to the inclined support surface;

c. providing a third generally rectangular foldable panel with an open mesh network, first and second vertical edges, an inner layer with a lower surface and an outer layer with a lower surface; and d. draping the third panel over the second support cable with the inner layer contacting the inclined surface and with the outer layer placed above and overlapping the inner layer and contacting the inclined surface such that the lower surface extends below and overlaps the first support cable and such that the overlap of the lower surface of the second panel defines a horizontal overlap zone with respect to the first panel.

43. The method of claim 42 including the further steps of:

a. providing a fourth generally rectangular foldable panel with an open mesh network, first and second vertical edges, an inner layer with a lower surface and an outer layer with a lower surface;

b. draping the fourth generally rectangular panel over the second support cable;

c. laterally aligning the fourth panel with respect to the second panel such that the adjacent vertical edges of each panel overlap to create a four layer vertical overlap zone between the third and fourth panels; and d. positioning the lower surface of the inner and outer layers of the fourth panel with respect to the second panel to define a horizontal overlap zone between the fourth panel and the second panel.

44. The method of claim 43 including the further steps of:

a. spraying a first layer of sealant onto the inner layers of the third and fourth panels and sealing the inner layer of the third panel to the inner layer of the fourth panel within the vertical overlap zone; and b. spraying a second sealant layer over the outer layers of the third and fourth panels and sealing the outer layer of the third panel to the outer layer of the fourth panel within the vertical overlap zone to define a stress absorbing joint between the third and fourth panels with alternating layers of panel and sealant.

* * * * *